Figure 6:
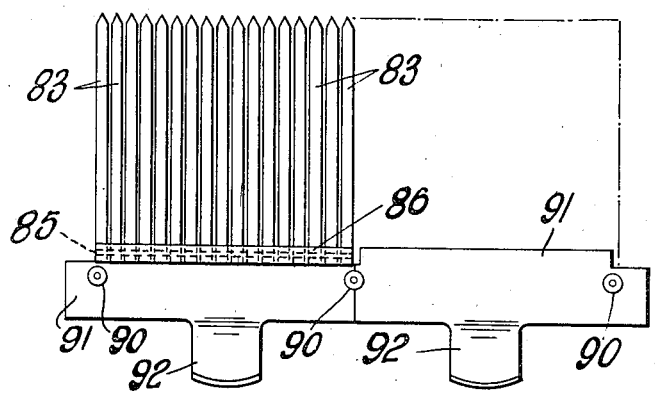

Oct. 15, 1940.    J. MOLDAWSKY    2,217,763
MEAT TENDERING APPARATUS
Filed Sept. 29, 1936    3 Sheets-Sheet 1
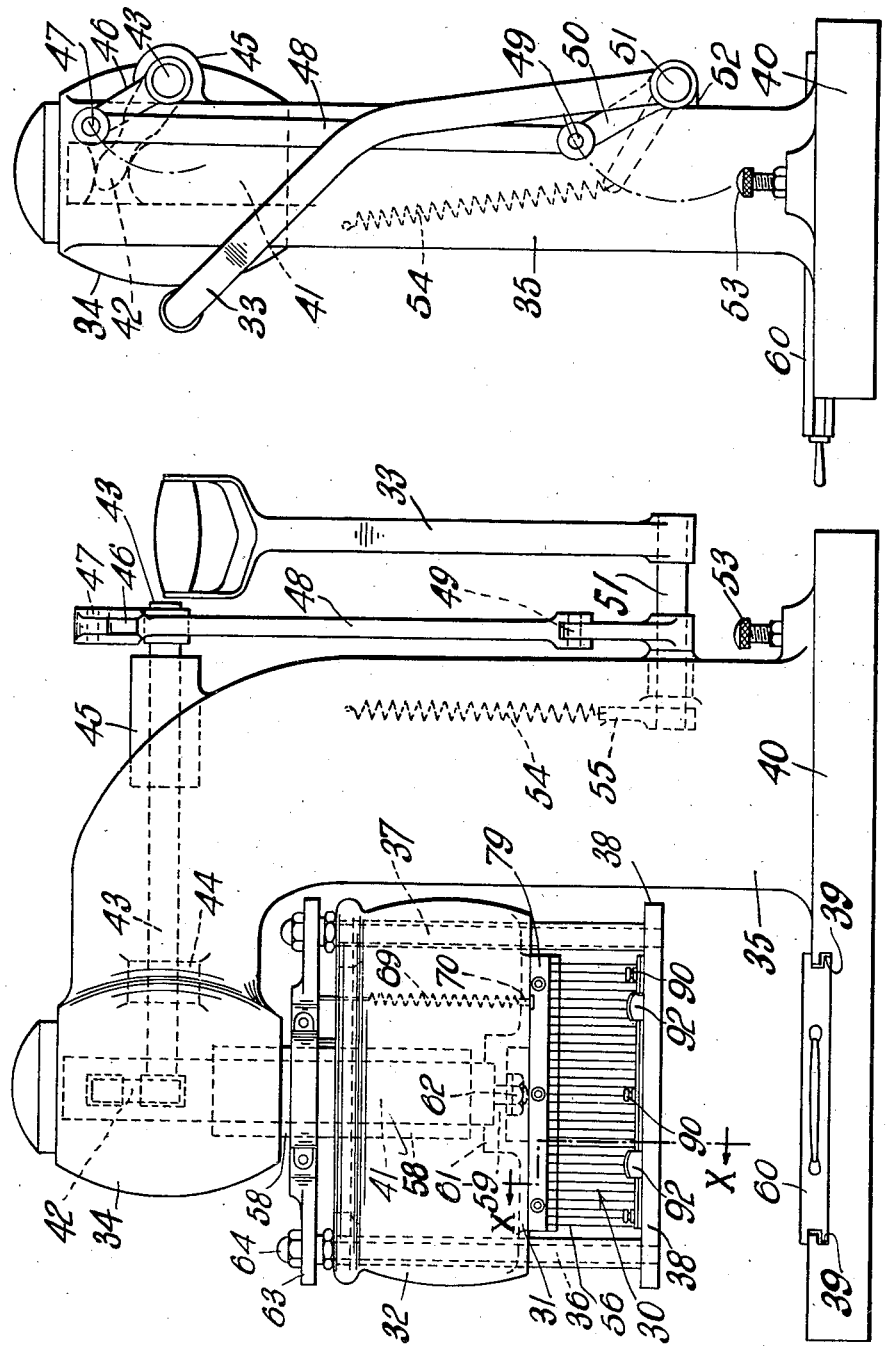

Oct. 15, 1940.  J. MOLDAWSKY  2,217,763
MEAT TENDERING APPARATUS
Filed Sept. 29, 1936  3 Sheets-Sheet 2
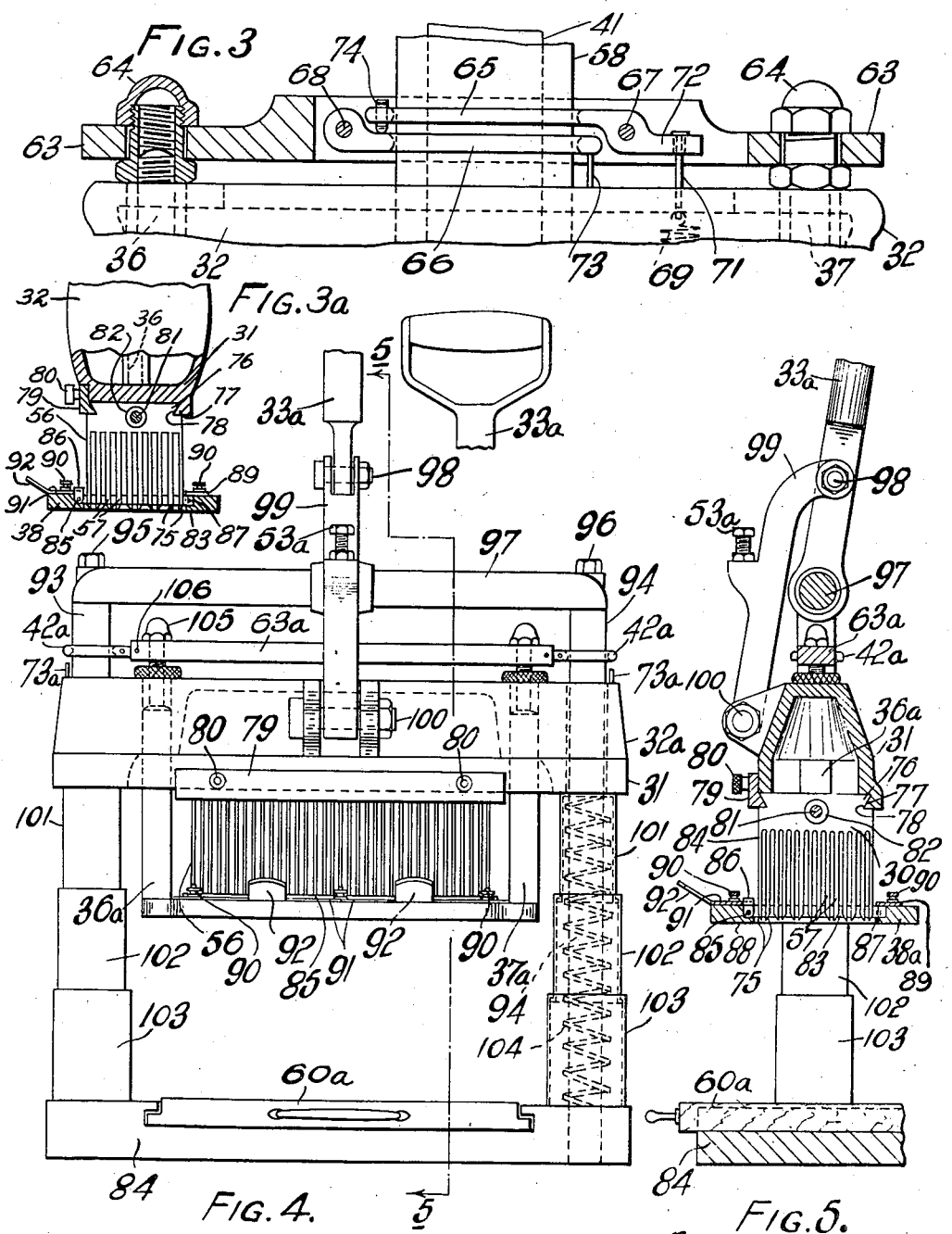

Oct. 15, 1940.  J. MOLDAWSKY  2,217,763
MEAT TENDERING APPARATUS
Filed Sept. 29, 1936  3 Sheets—Sheet 3

Patented Oct. 15, 1940

2,217,763

UNITED STATES PATENT OFFICE 2,217,763

MEAT TENDERING APPARATUS

Joseph Moldawsky, London, England, assignor to Leonard George Thomas Sedgwick, Westminster, England Application September 29, 1936, Serial No. 103,070
In Great Britain October 16, 1935

4 Claims. (Cl. 17—25)

This invention relates to apparatus for rendering meat tender by subjecting it to the action of a plurality of knives operated simultaneously.

The apparatus is of the kind having a plurality of knives fixed vertically in parallel relationship in a holder on a slide provided with means for moving the knives vertically through a vertically movable guide into a piece of meat supported on a table arranged under the knives.

The invention comprises broadly an apparatus for the aforesaid purpose, comprising one or more vertical guides, a knife holder for holding a number of knives in parallel, the knife holder being arranged to slide on one or more vertical guides and the vertical guide or guides supported on a base of the apparatus.

The knives are moved through a vertically movable grid or guide which is detachably clutched to a fixture of the apparatus.

The knives are formed like combs and so constructed that they will not deflect the sinews of the meat to one side or the other of the blades or of a group of blades but will sever the sinews into small adjacent sections. This is effected in the present invention by forming inclines on the adjacent blades of the knives of the same comb with inclines in opposite directions.

A manner of carrying out the invention is illustrated by the accompanying drawings in which Figure 1 is a front elevation of one form of the apparatus, Figure 2 is a side elevation of the same, Figure 3 is a detail of an automatic clutch as used in the said apparatus, Figure 3a is a section on the line 3a—3a of Figure 1, Figure 4 is an elevation of a modification of the machine, Figure 5 is a sectional side view on the line 5—5 of Figure 4 and Figure 6 is a plan of the guide or grid.

In the form of the machine illustrated in Figures 1 to 3 a block or group of knives 30 is held at its upper end in a holder 31 fixed on or formed on a main slide 32 movable vertically by lever mechanism operated by a manual lever 33. The slide 32 moves vertically on a cylindrical guide 58 fixed at its upper end in a boss 34 formed on a standard 35.

Sliding vertically in the slide 32 are rods 36 and 37 which carry at their lower ends a plate 38 recessed on its under side to engage meat placed on a table 60.

The table 60 comprises a block of wood or other suitable material formed as a horizontal slide in grooves 39 in a base 40 of the standard 35.

A plunger 41 is arranged to move vertically in the cylindrical guide 58 by a lever 42 fixed on a shaft 43 mounted in bearings 44 and 45 formed horizontally on the standard 35, the shaft 43 having on its projecting end an arm 46 of which the outer end is hinged by a pin 47 to the end of a link 48 pivoted at its other end by a pin 49 to the outer end of an arm 50 fixed on a shaft 51 mounted in a bearing 52 extending from the standard 35. On the shaft 51 is fixed the operating lever 33. The downward movement of the slide 32 is limited by an adjustable stop 53 arranged to be engaged by the arm 50 and the lever mechanism is returned by means of a spring 54 fixed at one end in the standard 35 and at the other to the end of an arm 55 fixed on the shaft 51.

In the block 30, the knives are formed of a series of combs 56 preferably of tempered steel plate, each prong having a lancet like end 57, Figure 3a. The knives proper are provided with long shanks having inclined V-shaped cutting edges on their ends, the inclination of the cutting edges of adjacent blades being in opposite directions.

The slide 32 is rotatively mounted on the vertically movable rod 41 so that the whole group of knives 30 can be moved to any horizontal angle with reference to the meat on the table 60. This rotary movement is effected on a transverse partition 59 in a tubular member 61 extending from the base of the slide 32, the partition 59 is engaged on its under side by a nut and washer 62 fitting on the lower screwed end of the rod 41.

The upper ends of the vertically sliding rods 36 and 37 are fixed on a plate 63 by nuts 64 and the plate 63 can be detachably clutched to the fixed cylindrical guide 58 by means of two rings 65 and 66 pivoted on horizontal pins 67 and 68 in an opening in the plate 63. The rings 65 and 66 are biased by gravity so that they tend to tilt downwardly from their pivot pins, but when the slide 32 is in its normal position relative to the plate 63, a projection 73 mounted on said slide maintains the ring 66 in a horizontal position, and an adjustable screw 74 carried by the ring 65 rests against said ring 66 to maintain said ring 65 also horizontal. In this horizontal position of the rings, they are clear of the guide 58 and therefore free to move therealong. When, however, during the downward movement of the knives, the plate 38 reaches the meat, it is stopped, together with the plate 63, and the slide 32 continues to move downwardly. The projection 73 accordingly disengages the ring 66 which tilts downwards, and also a spring 69, connected at one end by a pin 71 to a projection 72 extending from the ring 65 beyond its pivot, and at the other end by a pin 70 to the base of the slide 32, is put into tension and thereby tilts the ring 65 upwardly. The ring 66, being tilted downwardly, does not check the movement of the plate 63 in a downward direction, but the ring 65, being tilted upwardly, jams with the guide 58 when the plate 63 attempts to move downwardly, and thus prevents undue pressure being applied to the meat by the plate 38.

During the return movement of the blades, the ring 65 no longer jams, but the ring 66, being tilted downwardly, now jams with the guide 58 to prevent upward movement of the plate 63 and thus the plate 38 positively holds the meat in place until, upon the slide 32 reaching its normal position with respect to the plate 63, the projection 73 lifts the ring 66 back to the horizontal position. At the same time, the spring 69 loses its tension and the ring 65 also returns to the horizontal position, so that the plate 63, and therefore the plate 38, is free to move in both directions.

The series of knives forming the block 30 comprises a number of combs 56 formed of flat plates and of which the parallel prongs 57 are pointed at their lower ends 75, see Figure 5, and extend from backings 76 which have V-shaped projections 77 adapted to fit corresponding inclined grooves formed on the one side 78 in the lower face of the slide 32 and on the other side by the inclined edge of a plate 79 which is secured to the slide 32 by means of screws 80; the combs are held together by a rod 81 on which are threaded distance washers 82, the ends of the rod being held in place by nuts screwed on them.

The lower ends of the knives pass through guiding spaces formed between a series of bars 83 which have pointed ends to enable them to be pushed into place between the combs of knives 56 and are hinged at their other ends by pins 85 to a member 86 having bent ends to which the ends of the pins 85 are fixed. These guides may be formed in groups. Two are shown in the present example, see Figure 6, and the free ends of the bars 83 rest on a ledge 87, see Figure 5, formed in a rectangular opening in the plate 38 which is fixed to the rods 36 and 37. The hinged ends of the bars 83 rest on a similar ledge 88 formed in the plate 38 on the opposite side of the opening therein, and the bars 83 are held in place in the plate 38 on their free ends by a plate 89 and screws and nuts 90, and on their hinged ends by a plate 91 also held on 38 by screws and nuts 90, the plates 91 having an extension passing over the hinged ends of the bars 83 under the member 86 of which the bent ends carry the hinge pin 85. Each of the plates 91 has a handle 92 to facilitate placing the bars 83 in position between the combs 84.

During the operation of the apparatus a piece of meat is placed on the table 60 and the lever 33 pulled down to lower the knife slide 32 by means of the rod 41 until the plate 38 is arrested by the meat when further movement of the lever 33 forces the blades of the knives 57 into the meat and so cuts the sinews of the meat by reason of the inclined V-shaped edges 75 of the knives. When the pressure on the handle is relieved the spring 54 acting through the link and lever mechanism 50, 55, 46 and shaft 43 and lever mechanism 42, raises the slide 32 and restores the parts to their upper position.

As heretofore described, while the blades are being forced into the meat, the ring 65 jams with the guide 58 to restrain the movement of the plate 63 in a downward direction, and while the blades are being withdrawn from the meat, the ring 66 jams with said guide 58 to restrain the movement of said plate 63 in an upward direction, until, when the slide 32 reaches the normal position relative to the plate 63, both rings are released.

In the example illustrated by Figures 4 and 5 the machine is mounted on pillars 93 and 94 which at their lower ends are screwed or otherwise fixed in a base 84 in which slides horizontally a table 60a as in Figure 1. The upper ends of the pillars 93 and 94 are fixed by means of nuts 95, 96 to a transverse member 97 on which rocks a hand lever 33a. The hand lever 33 is pivoted at 98 to the upper end of a link 99, the lower end of the link 99 being pivoted at 100 to a vertically moving slide 32a in the base of which the knives are fixed in a holder 31 by means of a plate 79 as in Fig. 1. The reference 53a denotes an adjustable stop mounted on the link 99 for engaging the link 33a and limiting the movement of the mechanism in the down direction.

In both embodiments of the invention, the lower ends of the knives 30 pass through guide bars 83 in the plate 38, which plate is connected by the rods or bars 36 and 37 to the plate 63 (Fig. 1), 63a (Figs. 4 and 5).

The slide 32a has on its under side tubes 101 which are concentric with the pillars 93 and 94 and the tubes 101 telescope in the tubes 102 which telescope in the tubes 103 against the reaction of springs 104 surrounding the rods 93 and 94.

At the top of the rods 36a and 37a is mounted the horizontal plate 63a of which the upward movement is limited by the nuts 105. The ends of 63a are pivoted by pins 106 to extensions of rings 42a which tend to tilt by gravity in a downward direction, but when the slide 32a is in the normal position relative to the plate 63a, are maintained in the horizontal position by the projections 73a. The rings 42a thus act exactly as the ring 66 of Fig. 3 to prevent the plate 63a moving upwards except when the slide 32 is at the normal position relative to the plate 63a, and in the arrangement of Fig. 4, no check is normally provided against downward movement of the plate 63a except that provided by the meat itself. If, however, it is desired to prevent downward movement of the plate 63a and frame 38a, either just before or immediately upon the frame 38a engaging the meat, this can be done by tilting one or both of the rings 42a upwards by hand.

I claim:

1. Apparatus for rendering meat tender comprising parallel knives, a knife holder supporting said parallel knives, guiding means for said holder, means for moving said knife holder in opposite directions so as to force the knives into, and withdraw them from the meat, a locating element mounted on said knife holder so as to be movable relatively thereto, said locating element being adapted to engage the meat as the knives move in the piercing direction, whereupon said locating element is checked and the knives pass through it into the meat, automatically acting clutching means positioned above said holder and said locating element and co-operating with said guiding means, whereby said locating element is prevented from moving in either direction while the knives are being pressed into and withdrawn from the meat and means carried by and movable with said holder for making said clutching means inoperative upon the withdrawal of the knives from the meat and past said locating element.

2. Apparatus for rendering meat tender comprising parallel knives, a knife holder supporting said parallel knives, means for moving said knife holder in opposite directions so as to force the knives into, and withdraw them from the meat, a locating element mounted on said knife holder so as to be movable relatively thereto, said locating element being adapted to engage the meat as the knives move in the piercing direction, whereupon said locating element is checked and the knives pass through it into the meat, two rings pivotally mounted on said locating element, a fixed rod embraced by each of said rings, a stop carried by said knife holder, said stop being adapted normally to maintain one of said rings at a position at which it can move freely on its rod, and being adapted, upon said knife holder leaving its normal position relative to said locating element, to permit said ring to tilt in such a direction that it is adapted to jam with said rod when said locating element is urged away from the meat, and a spring connected between said knife holder and the other ring, said spring being adapted normally to permit said ring to occupy a position at which it can move freely on its rod, and being adapted, upon said knife holder leaving said normal relative position, to tilt said ring in such a direction that it is adapted to jam with its rod when said locating element is urged against said meat.

3. Apparatus for rendering meat tender comprising parallel knives adapted to be reciprocated to and fro so as to be forced into, and withdrawn from the meat, and a stripping device for retaining the meat as the knives are withdrawn, said stripping device comprising a base portion, a plurality of bars mounted on said base portion so that the knives pass between them, common removing means to which said bars are pivotally connected at their ends and by which they are adapted to be removed from and replaced on said base portion as a unit, the other ends of said bars being free, means whereby the free ends of said bars are supported against downward movement, and removable means carried by said base and engaging the free ends of said bars, whereby upward movement of said bars is prevented with movement of the knives from the meat.

4. Apparatus for rendering meat tender comprising parallel knives adapted to be reciprocated to and fro so as to be forced into, and withdrawn from the meat, and a stripping device for retaining the meat as the knives are withdrawn, said stripping device comprising a frame, a plurality of bars mounted on said frame so that the knives pass between them, said bars having opposite ends resting on ledges formed on opposite frame members, a common elongated removing element to which said bars at one end are pivotally connected, said removing element being removably mounted on one of said frame members, and a second elongated element removably mounted on the other frame member so as to overhang the ends of said bars.

JOSEPH MOLDAWSKY.